March 17, 1959 V. K. SHUTTLEWORTH ET AL 2,877,613
APPARATUS FOR TYING ARTICLES TOGETHER
Filed June 29, 1956 6 Sheets-Sheet 1
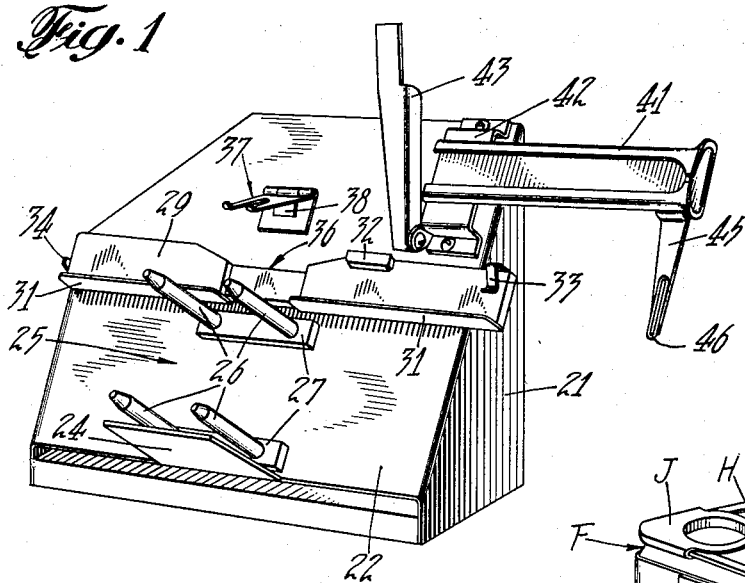
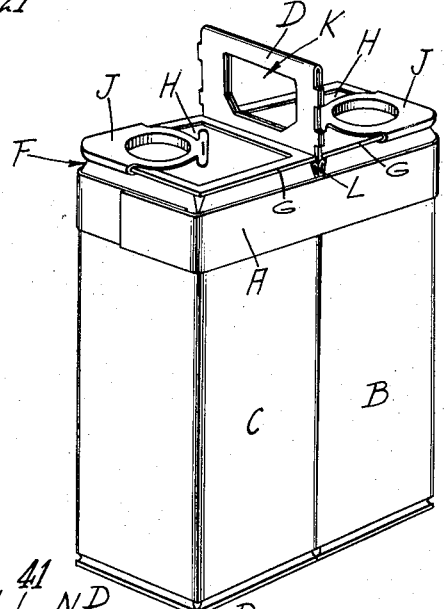
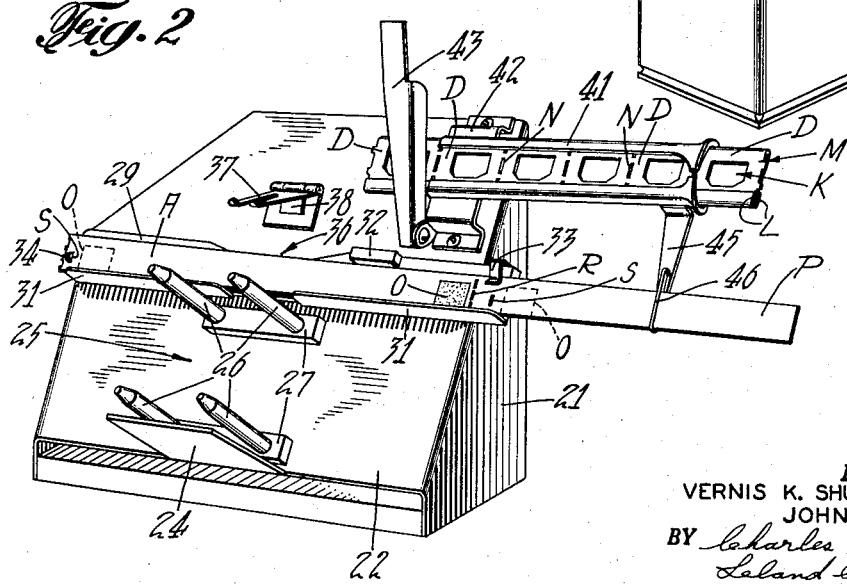
INVENTORS
VERNIS K. SHUTTLEWORTH
JOHN FELBER
BY Charles H. Ilne
Leland R. McCann
George W. Raber
ATTORNEYS March 17, 1959   V. K. SHUTTLEWORTH ET AL   2,877,613
APPARATUS FOR TYING ARTICLES TOGETHER
Filed June 29, 1956   6 Sheets-Sheet 2

*INVENTORS*
VERNIS K. SHUTTLEWORTH
JOHN FELBER
BY Charles H. Crane
Leland R. McCann
George W. Raber
ATTORNEYS March 17, 1959　　V. K. SHUTTLEWORTH ET AL　　2,877,613
APPARATUS FOR TYING ARTICLES TOGETHER
Filed June 29, 1956　　　　　　　　　　　　　　6 Sheets-Sheet 3
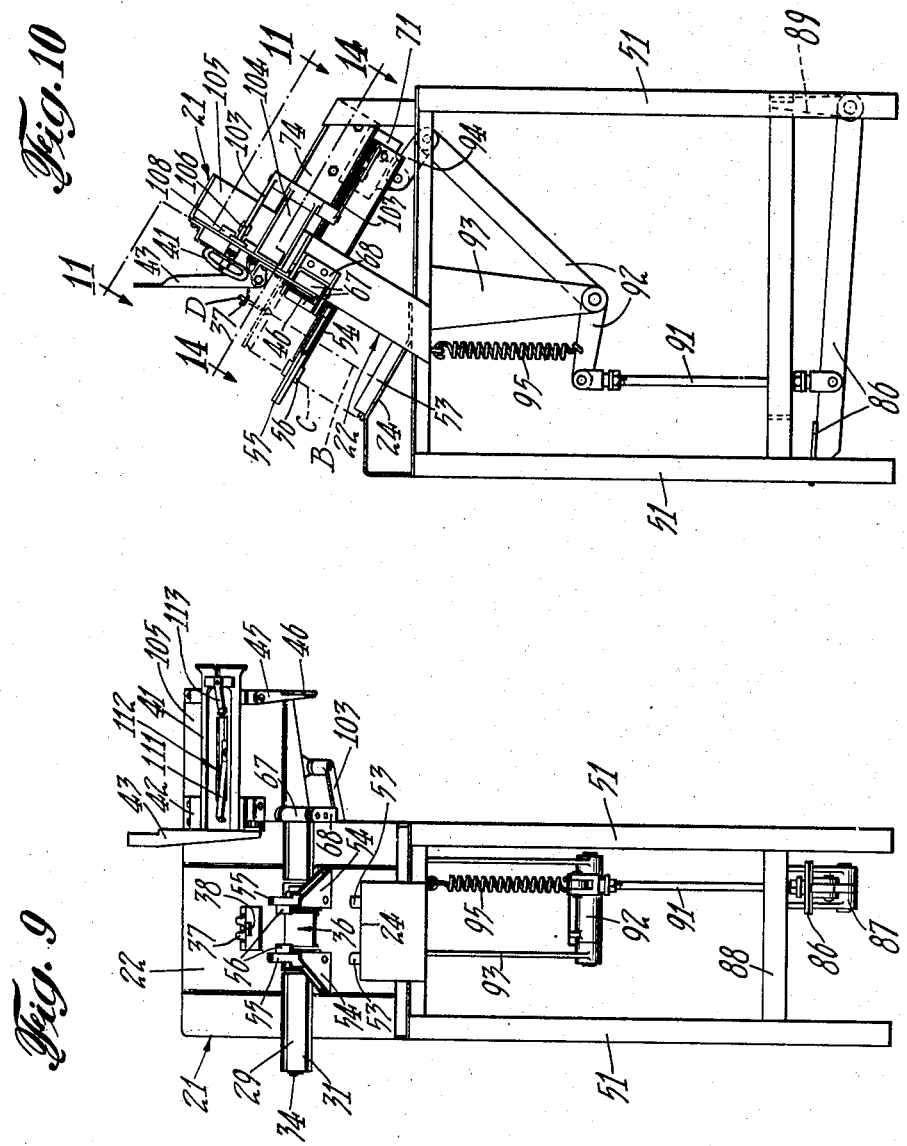
INVENTORS
VERNIS K. SHUTTLEWORTH
JOHN FELBER
BY Charles H. Erne
Leland R. McCann
George W. Reiber
ATTORNEYS

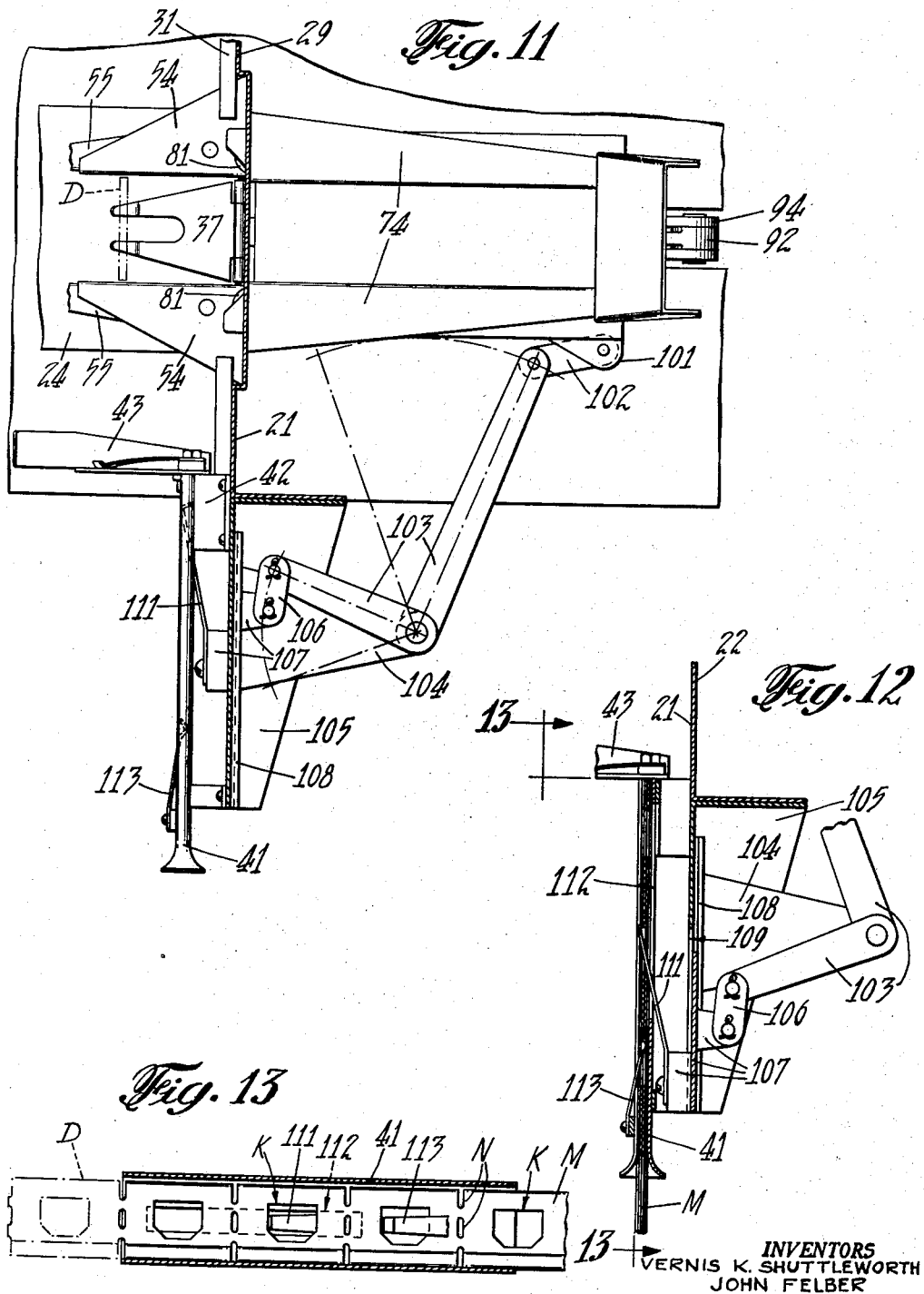

March 17, 1959 V. K. SHUTTLEWORTH ET AL 2,877,613
APPARATUS FOR TYING ARTICLES TOGETHER
Filed June 29, 1956 6 Sheets-Sheet 5
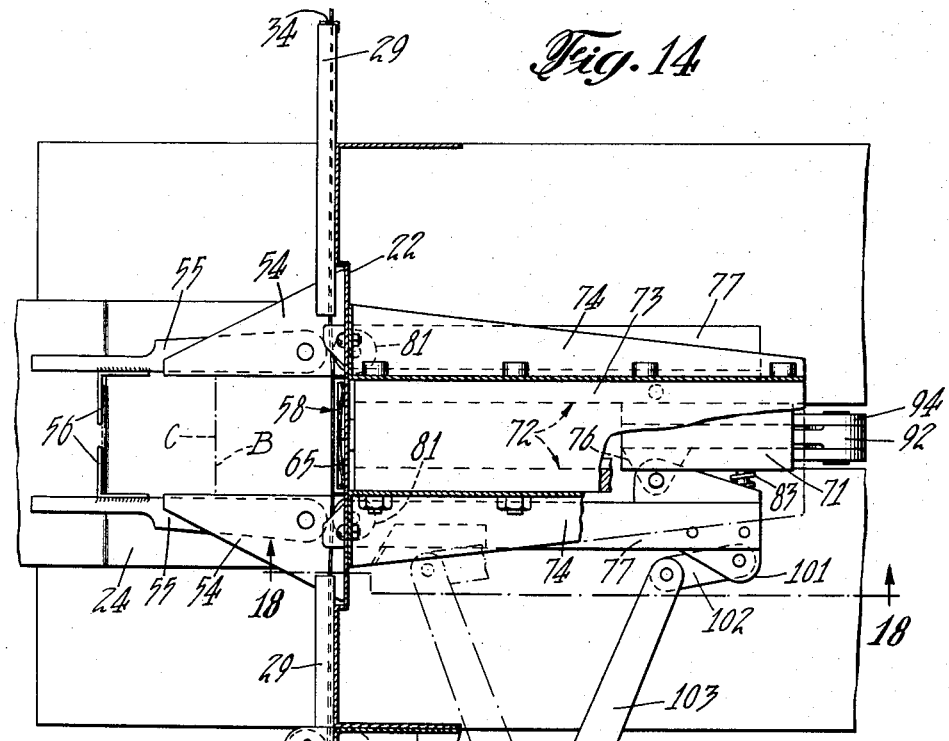
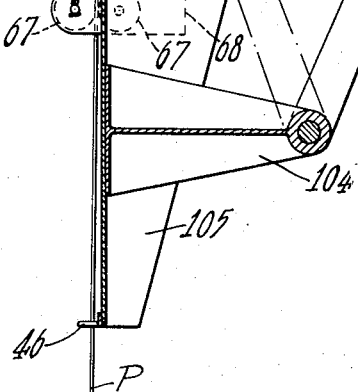
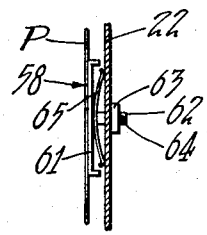
INVENTORS
VERNIS K. SHUTTLEWORTH
JOHN FELBER
BY
ATTORNEYS

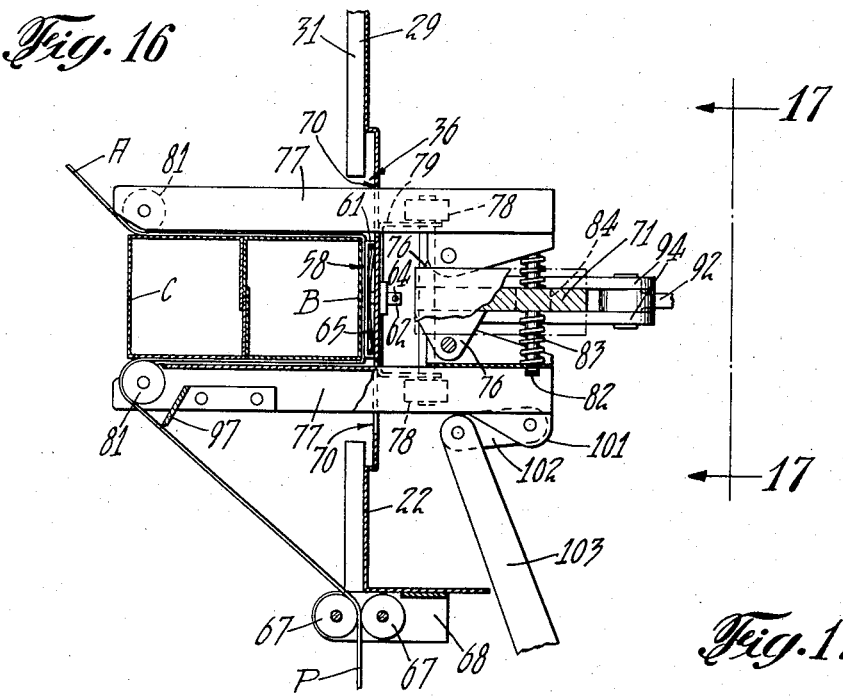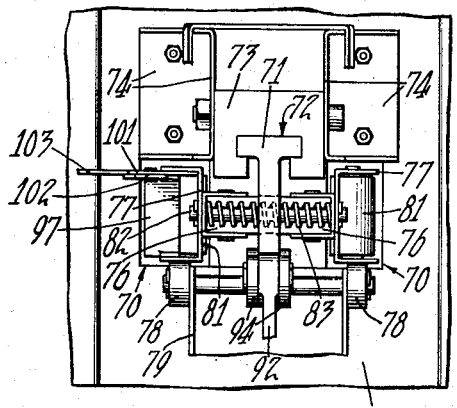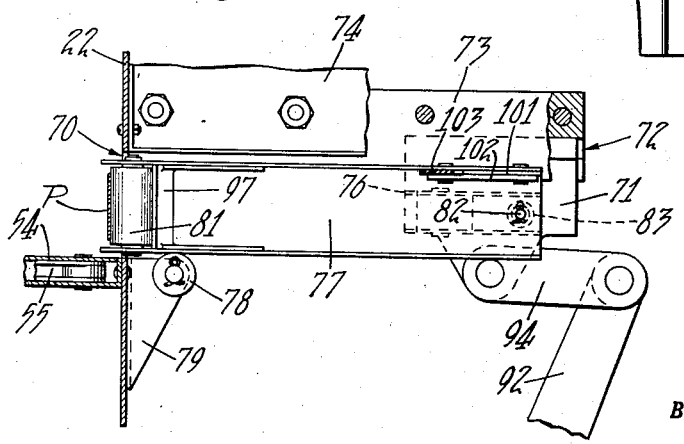

United States Patent Office 2,877,613
Patented Mar. 17, 1959

2,877,613

APPARATUS FOR TYING ARTICLES TOGETHER

Vernis K. Shuttleworth, Scarsdale, N. Y., and John Felber, Hillside, N. J., assignors to American Can Company, New York, N. Y., a corporation of New Jersey Application June 29, 1956, Serial No. 594,938

13 Claims. (Cl. 53—198)

The present invention relates to apparatus for tying together a plurality of articles to be carried as a unitary package and has particular reference to semi-automatic hand operated apparatus for assembling and banding together a plurality of fibre milk containers.

An object of the instant invention is the provision of a hand operated milk container assembling and banding machine which is low in cost and economical in operation so that it can be made readily available to small dairy plants which cannot afford to purchase or which have insufficient volume of business to warrant the purchase of high cost fully automatic machinery.

Another object is the provision of such apparatus which has novel features of construction which facilitate the assembly and banding together of a plurality of milk containers in a rapid and efficient manner and provides for lower costs in handling the containers.

Numerous other objects and advantages of the invention will be apparent as it is better understood from the following description, which, taken in connection with the accompanying drawings, discloses a preferred embodiment thereof.

Referring to the drawings:

Figures 1 and 2 are perspective views of an apparatus embodying the instant invention; Fig. 1 showing the apparatus empty and Fig. 2 showing portions of the packaging elements in place in the apparatus;

Fig. 3 is an enlarged perspective view of a plurality of milk containers banded together in a unitary package by the apparatus illustrated in Figs. 1 and 2;

Figure 4:
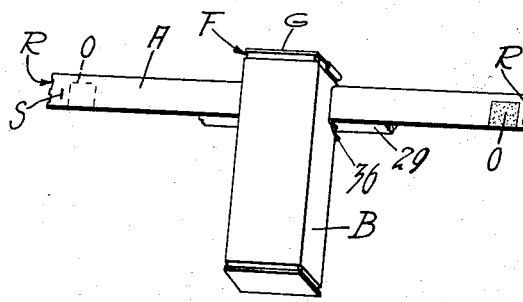

Figs. 4 to 8 inclusive are schematic perspective views showing how the containers are assembled and banded together in the apparatus shown in Figs. 1 and 2;

Fig. 9 is a front elevation of a modified form of the apparatus shown in Figs. 1 and 2;

Fig. 10 is a side elevation of the apparatus shown in Fig. 9, with containers in dotted lines shown in place in the apparatus;

Fig. 11 is an enlarged plan sectional view taken substantially along the broken line 11—11 in Fig. 10, with parts broken away;

Fig. 12 is a fragmentary plan sectional view of the lower portion of Fig. 11 with parts shown in a different position and with parts broken back;

Fig. 13 is a sectional view taken substantially along the broken line 13—13 in Fig. 12;

Fig. 14 is an enlarged plan sectional view taken substantially along the broken line 14—14 in Fig. 10, with parts broken away;

Fig. 15 is a sectional view of a detail of Fig. 14;

Fig. 16 is a plan sectional view similar to and showing a portion of Fig. 14, with certain of the parts broken back and with the movable parts in a different position;

Fig. 17 is an end elevation turned through an angle of ninety degrees and taken substantially along a plane indicated by the line 17—17 in Fig. 16; and Fig. 18 is a sectional view taken substantially along the broken line 18—18 in Fig. 14.

As a preferred or exemplary embodiment of the instant invention, Figs. 1 and 2 of the drawings illustrate an apparatus for tying together with an encircling fibre band or strap A (Fig. 3) a pair of fibre milk containers B, C arranged in juxtaposed relation, with a separate handle D disposed between them, for producing a unitary package which may be readily carried by the handle D, as shown in Fig. 3.

The containers B, C to be banded together preferably are of the rectangular construction disclosed in United States Patent 2,085,979, issued July 6, 1937, to John M. Hothersall on Container. Such a container comprises a rectangular body having flat side walls which at their upper ends are formed with necked-in portions F (Fig. 3) and an immediately adjacent outwardly or laterally projecting peripheral end seam or ledge G surrounding and securing in place a flat top member H having a dispensing opening sealed with a friction plug closure J hingedly connected to the top member H. In the juxtaposed relation of the containers B, C two side walls are directly opposite each other in substantially contiguous relation as shown in Fig. 3 and the ledges G along these sides are substantially coincident and hold the handle D between them.

The handle D preferably is made of fibre material and may be of any suitable design, preferably rectangular in shape with a finger opening K (Fig. 3) and along its bottom edge is provided with laterally projecting lugs L for engagement under the coincident ledges G of the containers as shown in Fig. 3. These handles D usually are made as connected links of an elongated strip M (Fig. 2) having dividing perforations N and are cut off individually from the strip as needed.

In a similar manner the bands A preferably are made of fibre material and consist of a length of the material sufficient to wrap around the two juxtaposed containers B, C, with an allowance for overlapping and securing together the ends of the band. At each end of the band and on opposite faces thereof a spot of pressure sensitive adhesive O is provided to secure the overlapped ends of the band after application to the containers. These bands A preferably are made like the handles D in the form of a long substantially continuous strip P (Fig. 2) having transverse perforations R to divide one band from the next adjacent in the strip and to provide for tearing the bands individually from the strip. A perforation or aperture S located adjacent the leading end of each band is utilized to locate the band in predetermined fixed position as will be hereinafter more fully explained.

The apparatus for assembling and tying together the containers B, C to produce the unitary package shown in Fig. 3 preferably is a hand operated device comprising in part an upright frame 21 (Figs. 1 and 2) having a backwardly slanting front wall or support 22 which carries the working parts of the device and against which the innermost or underlying container of the two in the package rests during the operations performed to complete the package. Adjacent its lower edge, the front wall 22 carries a container support pad 24 which is disposed near the middle of the length of the front wall and which projects outwardly from and perpendicular to the front wall. This pad 24 is of a width substantially equal to the width of one container and extends out from the front wall a depth of substantially two containers for supporting the two containers B, C in an upright juxtaposed two deep relation as shown in Fig. 3, leaning backward parallel with the front wall 22.

An open magazine 25 is provided to hold the two containers in place while they are banded together. This magazine 25 is defined by a plurality of guide bars 26 which are of a length substantially equal to the depth of the support pad 24 and which are arranged parallel with the support pad and in pairs vertically aligned and spaced apart, the bars of each pair being spaced apart substantially the width of one container. These guide bars 26 are anchored in horizontally disposed spacer blocks 27 which are secured to the front wall 22.

Above the magazine 25 at a distance just below the tops of the containers to be held therein, the front wall 22 carries a horizontally disposed guide rail 29 for holding and guiding the strip P (see Fig. 2) from which the bands A are obtained. This guide rail 29 is a substantially flat rail disposed parallel with the front wall 22 and along its lower edge is provided with an outwardly projecting short shelf 31 for supporting the strip P on edge. This band guide rail 29 extends the full length of the front wall 22 and preferably extends beyond the frame 21 at the right as shown in Figs. 1 and 2. At this end of the rail (at the right as viewed in Figs. 1 and 2) it is provided with an outwardly projecting guide lug 32 which is spaced above the shelf 31 a distance substantially equal to the width of the band A. Adjacent the guide lug 32 the rail 29 is also provided with a flat spring pressure clip 33 which overhangs the rail and presses the strip P against the rail.

At the opposite end of the rail 29 (at the left as viewed in Figs. 1 and 2), it is provided with an outwardly projecting finger 34 for insertion into the perforation S in the strip P to locate the strip. Adjacent the magazine 25 the guide rail 29 and its shelf 31 are cut away a distance substantially equal to the width of a container to form a well or recess 36, the bottom of which is substantially flush with the tops of the spacer blocks 27. Directly above the recess 36 a handle positioning hook 37 is hingedly connected to the front wall 22. This hook 37 is provided with a stop lug 38 which engages against the front wall 22 and retains the hook suspended at a predetermined level relative to the tops of the containers to be loaded into the magazine 25. This hook 37 is adapted to hold a handle D in a predetermined position for incorporation in the package at a proper location as will be hereinafter more fully explained.

The strip M of handles D to be used in the device is carried in a tubular track 41 located adjacent one side of the hook 37 (at the right as viewed in Figs. 1 and 2) and above the band guide rail 29 where it is handy for an operator. This tubular track 41 preferably is of rectangular shape to permit the strip M to readily slide through it and at one end is provided with a bracket 42 which is secured to the front wall 22 of the frame 21. The face of the track 41 preferably is open. At its end adjacent the hook 37, the track 41 is provided with a cut-off knife 43 which is pivotally mounted on the bracket 42 and which cooperates with the end of the track in cutting off a handle D at the strip perforations N when the knife is manually operated. The end of the track opposite its cut off end, preferably overhangs the frame 21 and carries a depending bracket 45 having at its lower end a wire loop 46 aligned with the band guide rail 29 for supporting the band strip P beyond and remote from the guide rail.

In operation, an operator manually threads a strip M of handles D into the handle track 41 as shown in Fig. 2 and similarly threads a strip P of bands A into the band guide rail 29, under the pressure clip 33 and pulls the strip along toward the locating finger 34 where he hooks the perforation S at the end of the strip, over the locating finger as shown in Fig. 2. In this relation of the strip P it bridges across the recess 36 in the guide rail 29. The operator next places the container B in the magazine 25 where its bottom is supported on the pad 24 and the side of the container adjacent the frame front wall 22 engages against the positioned band A in the strip P.

With the container B in this position, the operator pushes it down tight against the spacer blocks 27. This action forces the upper end of the container, near its top where it engages the strip P, into the recess 36 as shown in Fig. 4 so as to draw the strip P taut along the adjacent or engaged side of the container.

Figure 5:
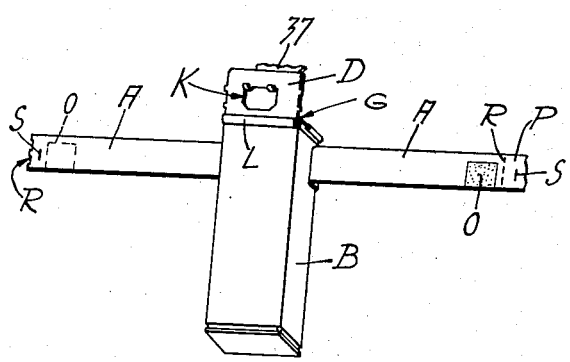

The container B and the engaged strip P remain temporarily in this position while the operator advances the handle strip M beyond the inner end of the track 41 to align the perforations N with the end of the track and to cut off a handle D from the strip. The cut off handle D is hung on the handle hook 37 as shown in Fig. 5. In this position, the lower edge of the handle where the lugs L are located, lies against the ledge G of the container B with the lugs L engaged under the ledge.

Figure 6:
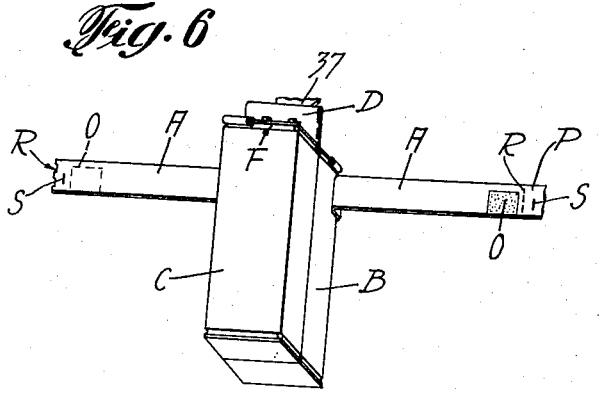

The second container C is now placed in the magazine 25 in juxtaposed relation to the container B as shown in Fig. 6. In this position of the container C, its ledge G coincident with the ledge G of container B, engages over the lugs L on the positioned handle D and presses against the side of the handle above the lugs L to retain the handle in place between them as a part of the unitary package being formed.

Figure 7:
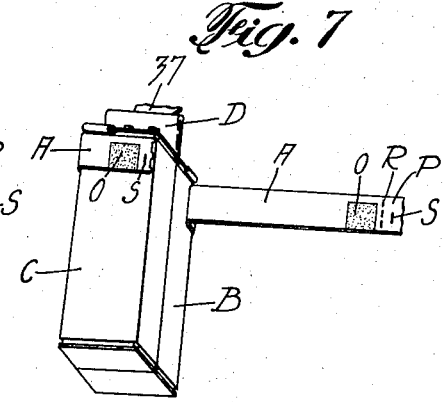

With the two containers B, C and the handle D in proper assembled position as shown in Fig. 6, they are now ready to be tied together. The operator now picks up the end of the strip P engaged over the locating finger 34 and pulls it taut upwardly along the vertical sides of the containers B, C and over the top side of container C as shown in Fig. 7, to wrap this end of the band half way around the assembled containers. In this position of this end of the band A it should be noticed that the spot of adhesive O which normally is on the underside of the band is now on top of the band in an exposed position.

Figure 8:
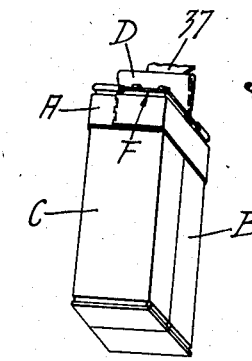

While holding this end of the band A in position against the top side of the container C, the operator pulls the strip P out from under the pressure clip 33 and draws it up taut alongside the assembled containers and laps it over the top side of the container C against the opposite end of the strip already held against this side as shown in Fig. 8. The spot of adhesive O on this overlapped portion of the strip P coincides with the adhesive on the first end and hence by a mere pressure exerted against the overlapped spots of adhesive, the ends of the encircling band A are made to stick together to hold the two containers in juxtaposed relation.

This accomplished, the strip P is torn along the perforations R to leave the encircling band A in place on the containers. The free end of the strip P is thereupon replaced on the strip guide rail 29, under the pressure clip 33, in readiness for a subsequent assembly of containers. This completes the container assembling and banding operations and the unitary package thereby completed as shown in Figs. 3 and 8 is removed from the device for use.

In a modified form of the invention as shown in Figs. 9 to 18 inclusive, the feeding of the handle strip M and the wrapping of the band A partially around the assembled containers B, C is effected by foot operated elements. In this modified form the frame 21 of the device preferably is mounted on legs 51 (Figs. 9 and 10).

The support pad 24 on which the containers B, C rest during the banding operation, preferably is made an integral part of the frame 21 and is fitted with a pair of spaced and parallel guide rails 53 (Figs. 9 and 10) to locate the two juxtaposed containers on the pad instead of the guide bars 26 of the preferred form. The locating of the containers is supplemented by a pair of sheet metal brackets 54 (see also Figs. 11 and 14) which are spaced above the rails 53 and which extend out from the frame front wall 22. Each of these brackets 54 carry a pivotally mounted clamp arm 55 which is provided with an L-shaped clamp 56 located to overlap the top side wall of the outermost container C (as best shown in Fig. 14) to hold the two assembled containers in position for banding. These clamp arms 55 are operated manually and are movable toward and away from the containers.

A yieldable compression pad 58 (Figs. 14, 15 and 16) is provided in the well or recess 36 in the front wall 22, to provide for a slight pressure on the containers held by the clamp arms 55 and to hold the strip P against the containers during the banding operation. This compression pad 58 preferably comprises a flat plate 61 (Fig. 15) which engages against the strip P and which is provided with a supporting pin 62 which extends through the front wall 22 and on the back thereof is held against displacement by a washer 63 and cotter pin 64. Between the plate 61 and the front wall 22 a curved flat spring 65 is provided to press the plate yieldably outward from the front wall so as to engage against the strip P and the adjacent side wall of the container B. The plate 61 is located in the path of travel of the strip P in the strip guide rail 29.

The strip P is threaded into position in the guide rail 29 in the same manner as in the preferred form of the invention. However the guide rail 29 preferably is channel shape instead of L-shape as in the preferred form. The strip locating finger 34 is retained at one end of the rail. Adjacent the entrance end of the rail the pressure clip 33 is replaced by a pair of pressure rollers 67 which are located in the path of travel of the strip for passage of the strip between them. These rollers 67 are carried in brackets 68 secured to the frame 21.

When the strip P is in position across the recess 36, and its free end anchored on the locating finger 34, the two containers B, C with a handle D in place between them, are positioned against the strip (see Figs. 10 and 14) as in the preferred form and the strip is then wrapped around the containers. This wrapping action is effected mechanically. For this purpose, the device is provided with a T-shaped slide 71 (Figs. 10, 14, 16, 17 and 18) which is carried on the back of the front wall 22 in perpendicular relation thereto for movement toward and away from the assembled containers B, C. The slide 71 operates in a T-slot 72 formed in a block 73 secured by brackets 74 to the frame 21. The slide 71 is formed with a pair of oppositely disposed laterally projecting lugs 76 which carry a pair of pivotally mounted wrapping fingers 77, disposed one on each side of the slide. These fingers 77 project through openings 70 in the front wall 22 and extend substantially parallel with the side walls of the two assembled containers B, C and are located adjacent opposite sides of the containers for movement therealong. The fingers are partially supported on rollers 78 (Figs. 17 and 18) located below the fingers and carried in a bracket 79 secured to the back of the front wall 22.

At one end, adjacent the front wall 22, each finger 77 carries a wrapping roller 81 (Figs. 16, 17 and 18). At their opposite ends, the fingers 77 are yieldably connected by a transverse pin 82 having a surrounding compression spring 83 interposed between the fingers and extending through an opening 84 (Fig. 16) in the slide. The ends of the pin 82 carry cotter pins to prevent displacement of the fingers 77 from the pin. The spring 83 tends to keep the adjacent ends of the fingers 77 spread apart and thus hold the wrapping rollers 81 in a spaced relation slightly less than the width of the containers B, C to insure engagement of the rollers 81 against the containers during the banding operation.

The fingers 77 are normally disposed in a retracted position, with their rollers 81 located back of the strip P, as best shown in Figs. 14 and 18 and are moved forward toward the strip during the banding operation. This movement is effected by foot power applied to a treadle 86 (Figs. 9 and 10) pivotally mounted on a bracket 87 attached to a cross member 88 on the legs 51. A stop lug 89 on the treadle engages against the cross member 88 to limit the upward travel of the treadle.

The treadle 86 is attached by a link 91 to a bell crank 92 mounted on a pivot pin carried in a bracket 93 depending from the frame 21. The bell crank 92 is connected by a pair of parallel links 94 to the slide 71 (see Figs. 16, 17 and 18). A tension spring 95 stretched between the frame 21 and the bell crank 92 holds the treadle 86 in an uppermost position.

By stepping on the treadle 86, the link 91 pulls down on and rocks the bell crank 92 to push the slide 71 through a working stroke toward the strip P. During this working stroke the wrapping rollers 81 exert a pressure on the strip P held by the pressure pad 58, and thus tear the located end of the strip off its locating finger 34 and pull the other end through and between the pressure rollers 67. As movement of the slide continues the rollers 81 press the strip P tightly against and roll it along the side walls of the assembled containers B, C until at the end of the stroke the strip and the rollers are adjacent the top side wall of the top container C as shown in Fig. 16. While the rollers 81 hold the strip P taut against the containers by continued foot pressure on the treadle 86, the loose end of the strip is drawn manually over the top side wall of the container C as in the preferred form of the invention and the strip on the opposite side of the container is torn off along the perforations R in the strip and drawn over the top of the positioned end and pressed tight manually to provide the band A and to tie the containers together as in the preferred form. A fixed knife 97 (Figs. 16, 17 and 18) is attached to the finger 77 adjacent the continuous end of the strip P to facilitate tearing the strip along the perforations R to produce the band A.

With the two containers B, C thus banded together to provide a unitary package as shown in Fig. 3, the foot pressure on the treadle 86 is released and the tension spring 95 thereupon returns the slide 71 and its wrapping fingers 77 to their retracted positions for a repeat operation.

The movement of the foot treadle 86 through its downward working stroke, also advances the strip M of handles D along its tubular track 41 so as to project beyond the cut off end of the track one handle D so that it will be ready to cut off when needed, by manual manipulation of the cut off knife 43. For this purpose the wrapping finger 77 nearest the tubular track 41 is formed with a lug 101 (Figs. 11, 14, 16, 17 and 18) which carries a pivotally mounted link 102 the opposite end of which is connected to a bell crank 103. The bell crank is pivotally mounted on a bracket 104 attached to a lateral extension 105 of the frame 21 adjacent the tubular track 41. Adjacent the track 41 the bell crank 103 carries a link 106 which is pivotally connected to a horizontal slide 107 operating in a pair of spaced and parallel slideways 108 (Fig. 12) mounted on the back of the front wall 22 on opposite sides of an opening 109 in the wall. The slide 107 carries a flat spring finger 111 which extends through an opening 112 (Figs. 12 and 13) in the back of the tubular track 41.

As the slide 107 reciprocates, the finger 111 engages in a finger opening K in the strip M of handles D in the tubular track 41 and thus advances the strip the length of one handle and upon a return stroke moves back the length of one handle and drops into the next finger opening K. On this return stroke the strip M is held against moving back with the finger 111, by a stationary hold-back finger 113 which is secured to the front of the tubular track 41 and which engages in the finger openings K of the strip.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A machine for banding together a plurality of articles to produce a unitary package, comprising a support for said articles in stationary position, a magazine adjacent said support for receiving and holding a plurality of said articles in a predetermined juxtaposed relation, means disposed adjacent said support for guiding and holding a longitudinally movable flexible band in a predetermined position adjacent said articles, and means disposed adjacent the leading end of said band guiding means and spaced laterally from said magazine for removably engaging and locating the leading end of said band in predetermined fixed position relative to said magazine to facilitate wrapping of said band around said articles to tie them together to produce a unitary package.

2. A machine of the character defined in claim 1 wherein said band guiding means comprises a fixed flanged guide rail for supporting said band on edge.

3. A machine of the character defined in claim 2 wherein said guide rail adjacent said magazine is provided with an offset recess across which said band extends, said recess being adapted to receive one of said articles to draw said band taut around the received portion of said article.

4. A machine of the character defined in claim 2 wherein said band engaging and locating means comprises a projecting finger for removably engaging an aperture in the leading end of said band.

5. A machine of the character defined in claim 2 wherein said guide rail is provided with spring means for removably engaging and retaining said band in longitudinally flexed position on said rail.

6. A machine of the character defined in claim 1 having hook means for removably engaging and supporting a carrying handle in a predetermined fixed position relative to the articles in said magazine for incorporation between said articles in said unitary package.

7. A machine of the character defined in claim 1 having tubular track means for receiving and supporting a strip of movable connected handles, and knife means for cutting off said handles individually for respective incorporation between said articles in said unitary package.

8. A machine of the character defined in claim 1 wherein said support comprises an inclined wall having an angularly disposed pad located adjacent said magazine for supplementing the support of said articles.

9. A machine of the character defined in claim 1 having movable clamp means located adjacent said magazine for partially surrounding and clamping said articles in place in said magazine.

10. A machine of the character defined in claim 9 wherein said clamp means comprises a pair of pivotally mounted arms disposed on opposite sides of said magazine for movement toward and away from said magazine, said arms carrying clamping members movable into partially surrounding engagement with at least one of said articles.

11. A machine of the character defined in claim 1 having a resilient pad disposed adjacent said magazine for yieldably pressing said flexible band against one of said articles to hold the band in place while wrapping the same around said articles.

12. A machine of the character defined in claim 1 having movable elements adjacent said magazine for pressing said band against said articles and for partially wrapping said band around said articles, and means for actuating said elements.

13. A machine of the character defined in claim 1 having a tubular track for receiving and supporting a strip of connected handles to be severed individually therefrom for respective incorporation into said unitary package, means for feeding said handle strip along said track, and elements for retaining said strip in a fed position for the severance of a handle therefrom.

References Cited in the file of this patent

UNITED STATES PATENTS

| | | |
|---|---|---|
| 1,880,926 | Egenolf | Oct. 4, 1932 |
| 2,766,567 | Fahrenback | Oct. 16, 1956 |